United States Patent
Jayaraman et al.

(10) Patent No.: US 7,983,325 B2
(45) Date of Patent: Jul. 19, 2011

(54) DECODING OF THE OVERHEAD CHANNELS OF THE GEOSYNCHRONOUS (GEO) SATELLITE REVERSE LINK

(75) Inventors: Srikant Jayaraman, San Diego, CA (US); June Namgoong, Chula Vista, CA (US)

(73) Assignee: QUALCOMM Incorporated, San Diego, CA (US)

( * ) Notice: Subject to any disclaimer, the term of this patent is extended or adjusted under 35 U.S.C. 154(b) by 870 days.

(21) Appl. No.: 11/933,360

(22) Filed: Oct. 31, 2007

(65) Prior Publication Data
US 2008/0285632 A1 Nov. 20, 2008

Related U.S. Application Data

(60) Provisional application No. 60/855,391, filed on Oct. 31, 2006.

(51) Int. Cl.
*H04B 1/00* (2006.01)
(52) U.S. Cl. .......... 375/150; 375/325; 375/343
(58) Field of Classification Search ............. 375/150, 375/325, 343
See application file for complete search history.

(56) References Cited

U.S. PATENT DOCUMENTS

| | | | | |
|---|---|---|---|---|
| 5,737,327 A * | 4/1998 | Ling et al. | | 370/335 |
| 6,198,719 B1 * | 3/2001 | Faruque et al. | | 370/209 |
| 2004/0071193 A1 * | 4/2004 | Atarashi et al. | | 375/144 |
| 2004/0193971 A1 * | 9/2004 | Soong et al. | | 714/704 |
| 2004/0246998 A1 * | 12/2004 | Ma et al. | | 370/527 |
| 2005/0111397 A1 * | 5/2005 | Attar et al. | | 370/319 |
| 2005/0135324 A1 * | 6/2005 | Kim et al. | | 370/343 |

FOREIGN PATENT DOCUMENTS

| | | |
|---|---|---|
| EP | 1158708 A1 | 11/2001 |
| GB | 2311702 | 10/1997 |
| WO | WO9944304 | 9/1999 |

OTHER PUBLICATIONS

Cochet, "Digital transform for a selective channel estimation (application to multicarrier data transmission)" IEEE international conference on communications (ICC) 1998, vol. 1, Jun. 7, 1998, pp. 349-354.*

International Search Report and Written Opinion—PCT/US2007/083242, International Search Authority—European Patent Office—Mar. 13, 2009.

* cited by examiner

*Primary Examiner* — Juan A Torres
(74) *Attorney, Agent, or Firm* — Jeffrey D. Jacobs

(57) ABSTRACT

A power efficient technique is used to demodulate the coded overhead channels of a geosynchronous (GEO) satellite uplink. A coherent receiver used in a wireless communication system is able to determine the information conveyed in the overhead channel, by effecting channel estimates from codewords extracted from a pilot signal. A valid set of codewords is established. Pilot symbols are extracted from a pilot signal and a channel estimate is made from the pilot signal. Codewords in the set of valid codewords are correlated and a channel phase ambiguity in the signals is removed and a codeword with the largest correlation is chosen. The chosen codeword is used to create a revised channel estimate.

22 Claims, 6 Drawing Sheets

DECODING OF THE OVERHEAD CHANNELS OF THE GEOSYNCHRONOUS (GEO) SATELLITE REVERSE LINK

RELATED APPLICATIONS

This application claims the benefit of U.S. Provisional Application No. US60/855,391 filed Oct. 31, 2006. The aforementioned provisional application's disclosure is incorporated herein by reference in its entirety.

BACKGROUND

I. Field

The present invention relates to satellite based wireless communication systems, in particular, methods for decoding overhead channels transmitted on a satellite link, such as the reverse link (up-link) to a geosynchronous (GEO) satellite.

II. Background

The reverse link channels for wireless communications typically consist of the pilot channel, traffic/data channel, and the overhead channels. The pilot channel provides a reference signal known to the receiver at the gateway demodulator and is used for channel estimation. The traffic channel conveys the data packets from the user application. The overhead channels are used to indicate to the gateway the information necessary to operate the forward link and reverse link.

A user terminal communicating with a gateway through a GEO satellite may need to support multiple data rates on the forward and reverse links. The link from the gateway on the ground to the user terminal via the satellite is the "forward link" and the link from the user terminal to the gateway on the ground via the satellite is the "reverse link". To indicate the data rate that is supportable on the forward link, the terminal uses a Data Rate Control (DRC) channel transmitted on the reverse link. Similarly, to indicate the data rate at which the reverse link data channel is transmitted, the terminal uses the reverse rate indicator (RRI) channel. The RRI channel is transmitted at all times, even when no data packets are being sent on the reverse traffic channel. This may be accomplished by indicating a "zero data rate" or "null rate" on the reverse traffic channel. The DRC and RRI channels are examples of overhead channels. They can be carried in two separate overhead channels or alternately, can be combined into one overhead channel. An overhead channel may be separated from the other channels by means of orthogonal code multiplexing, such as with Walsh codes. For example, each overhead channel may be encoded, modulated and spread with its own unique Walsh code to maintain channel separation from the pilot channel, the traffic channel, and the other overhead channels.

SUMMARY

Traditional error control techniques introduce some redundancy in the information sequence in a controlled manner such that the redundancy can be used at the receiver's decoder to overcome the effects of noise and interference encountered in the transmission channel, thus increasing the reliability of the received data.

A coherent receiver, used in a wireless communication system, determines a codeword conveyed in an overhead channel. The receiver receives the codeword conveyed in the overhead channel, and correlates the received codeword with at least a subset of a set of valid codewords to establish a set of cross-correlations for the received codeword. The set of cross-correlations correspond to each member of the subset of the set of valid codewords. Pilot symbols are extracted from a received pilot signal, and a channel estimate is formed from the extracted pilot symbols. A set of metrics are formed from the set of cross-correlations and from the channel estimate. A selection is made of an estimated codeword corresponding to a maximum metric from the set of metrics.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout and wherein.

DETAILED DESCRIPTION

Overview

Figure 1:
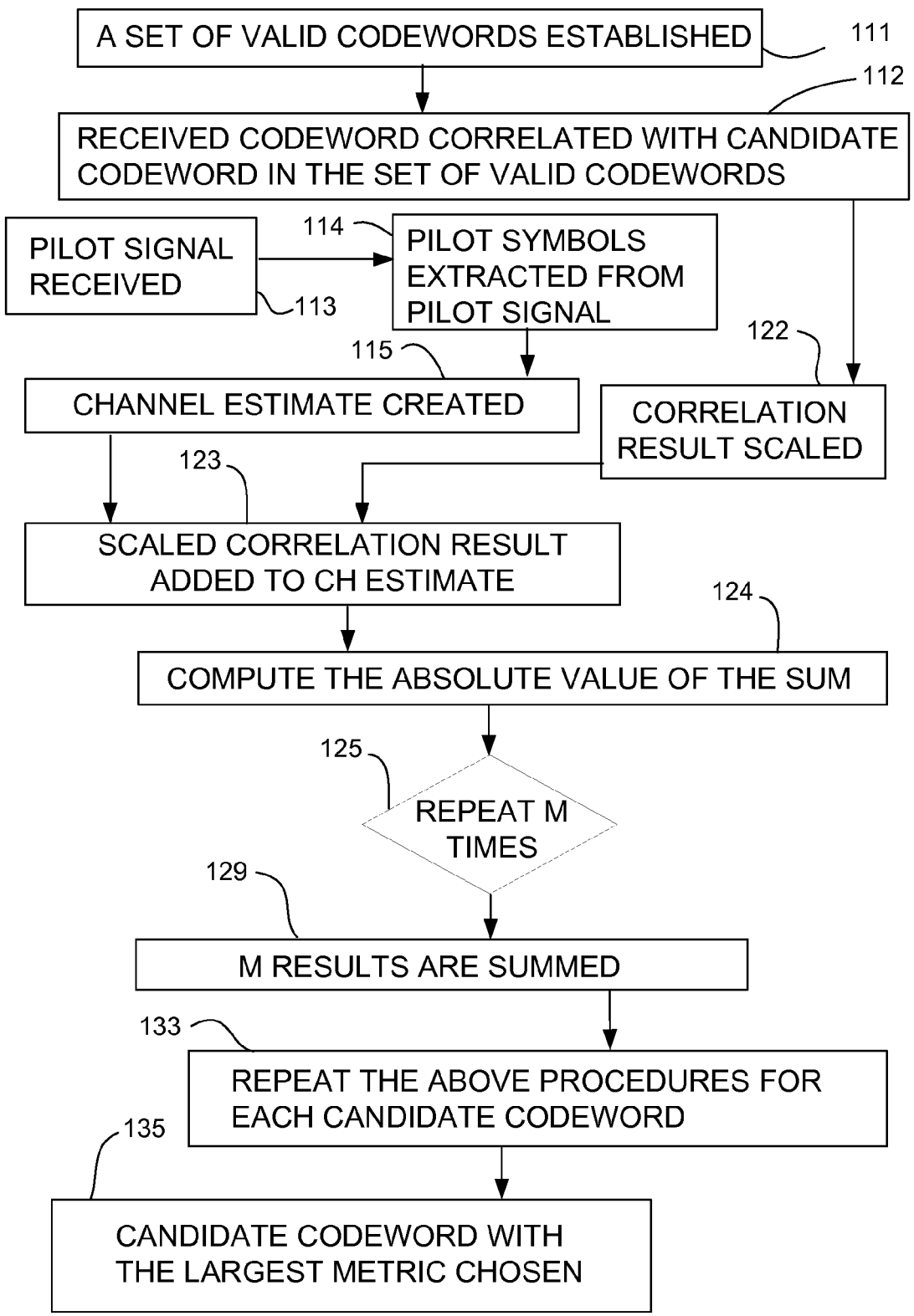
FIG. 1 is a flow diagram showing the functional operation of a receiver for the GEO satellite reverse link using maximum likelihood decoding in accordance with an optimal configuration.

Various illustrative configurations are discussed in detail below. While specific steps, configurations, and arrangements are discussed, it should be understood that this is done for illustrative purposes only. A person skilled in the relevant art will recognize that other steps, configurations, and arrangements can be used without departing from the spirit and scope of the present invention.

Reference herein to "one embodiment", "an embodiment", or similar formulations, means that a particular feature, structure, operation, or characteristic described in connection with the embodiment, is included in at least one embodiment of the present invention. Thus, the appearances of such phrases or formulations herein are not necessarily all referring to the same embodiment. Furthermore, various particular features, structures, operations, or characteristics may be combined in any suitable manner in one or more embodiments.

Various attributes are believed to be important for commercially successful emergency phones service over a satellite link. For example, the service must be cost-effective and economical; the phones must be able to operate over terrestrial wireless networks in non-emergency situations; and the phones must be small, consistent with modern consumer expectations. This last requirement places severe restrictions on the engineering design of such a device, particularly with respect to its antenna and transmitter design. The desire for a compact, low-cost and easy-to-use device precludes complex antenna designs. Furthermore, the transmitter power is limited by regulatory requirements because the phone's transmitter is held close to the user's head. Additionally, since increased transmitter power directly reduces battery-life and stand-by time, it is clearly desirable to reduce transmitter power as far as possible without degrading link reliability.

It is desirable to design techniques to decode overhead channels as efficiently as possible, especially in a satellite communication system, in order to minimize the power that must be transmitted by the user terminal for the pilot channel and for the overhead channels. The power savings can be used to increase the power expended on the traffic/data channel, allowing for more reliable data transmissions. A solution for the GEO satellite reverse link is to employ variations of the maximum likelihood principle in the presence of partial channel uncertainty, i.e., in situations when the channel estimate derived from the pilot signal may not be completely accurate. This can result in a power efficient technique to demodulate the coded overhead channels transmitted on the GEO satellite reverse link.

One possibility for reducing the necessary transmitter power in the user terminal is to have a larger antenna or a more sensitive receiver in the GEO satellite. But this approach is expensive. A more cost-effective solution is to optimize the demodulator algorithms, thus reducing, as far as possible, the power needed for transmitting the "pilot" channel and various "overhead" channels. If necessary, the power saved can be expended on the "data" channel to increase reliability of the data transmission. In case the data channel is already sufficiently reliable, the power savings can be used to conserve battery-life.

The various demodulator algorithms must cope with channel uncertainty caused by, for example, channel time variations due to fading and interference. Even if the communication channel is quasi-static, the channel state is never known perfectly to the receiver because of residual errors from estimating the channel using the pilot signal embedded in the reverse link transmission. The simplest way to reduce channel estimation error is to transmit a stronger pilot signal on the reverse link. But this approach is not always desirable because it requires either an increase in total transmitter power or, if total transmitter power is fixed, a corresponding reduction in the power of the other code multiplexed channels.

An alternate solution is to employ demodulator algorithms which can cope with partial channel uncertainty. By contrast, typical data demodulation algorithms ignore channel estimation error and this often inaccurate assumption leads to poor demodulator performance and poor link reliability.

A solution for the geosynchronous (GEO) satellite reverse link is to employ demodulator algorithms using variations of the maximum likelihood principle in the presence of partial channel uncertainty for demodulating the overhead channels. This can result in efficient and reliable communication over the satellite reverse link.

Motivation

The Maximum Likelihood (ML) method assumes that the probability density function of the received signal (conditioned on the channel) is known, and seeks to maximize the likelihood function (or the joint probability density function of the received signal) as a function of the channel parameters. The information sequence is selected that corresponds to the codeword with the best agreement to the detected sequence of received code symbols. An ML decoder deduces the codeword which is deemed "most likely" to lead to the received signal. The maximum likelihood decoding algorithm is computationally complex because the entire codeword space must be considered in the optimization process.

To improve the quality of demodulation in the reverse link, variations of maximum likelihood decoding in the presence of partial channel uncertainty are presented.

The methods are power-efficient and solve the problems of demodulation of the coded overhead channels of a GEO satellite reverse link. Two methods are:

First method—Maximum likelihood decoding when partial channel information is available.

Second method—Suboptimal version of the first method that is more implementation-friendly. It can be implemented with a suitable modification to conventional demodulation techniques.

For the overhead channel, a simplex code or bi-orthogonal code can be used for error correction. If the number of bits to be encoded is small (typically 3 bits), the simplex code is preferred. However, as the number of bits increase, the performance gap between the bi-orthogonal code and the simplex code shrinks. In this case, the bi-orthogonal code may be preferred due to its simpler implementation based on the Hadamard transform. The Hadamard transform is also known as the Walsh transform, the Walsh-Hadamard transform, or the Walsh-Fourier transform. The Hadamard transform can be represented as a matrix multiplication operation where the matrix is purely real, orthogonal and symmetric.

Power Limited Reverse Link

The transmitter power and the propagation path loss from the user terminal to the satellite determine the maximum signal strength received at the satellite. Then, given the noise sensitivity of the satellite and the demodulation/decoding algorithms at the gateway, the received signal strength determines whether reliable communication is possible. Therefore, the GEO satellite reverse link is "power limited", and hence, it is desirable to minimize the total received power required at the receiver for reliable communication. The total received power consists of the pilot, data and overhead channel power. If the signal attenuation and phase is perfectly known to the receiver, the minimum required received power of the data channel and that of the overhead channel are determined based on the spectral efficiencies and the selected codes for these channels. In practice, the attenuation and phase of the propagation channel is not known, and it is necessary to employ the pilot signal to estimate it. Since the estimates are noisy, the required received power for the data and overhead channels will increase. The more the power allocated to the pilot, the smaller the increase in the required received data and overhead power. Nevertheless, increasing the pilot power does not necessarily minimize the total signal power required for reliable communication. Therefore, the pilot power should be optimized in such a way that the total received power is minimized. Notice that the "optimum" pilot power depends on the employed demodulation/decoding algorithm. Hence, the goal is to design a power efficient demodulation/decoding algorithm.

In a conventional coherent receiver used in a wireless communication system, in order to determine the information conveyed in the overhead channel, a conventional coherent receiver does the following:

1. Correlate the received codeword with each candidate codeword,

2. Remove the channel induced phase ambiguity using the channel estimate obtained from the pilot symbols, 3. Choose the codeword with the largest correlation.

The Walsh-Hadamard transform is commonly employed to establish a set of valid codewords from a small block code. Here, more power efficient methods are presented to demodulate and decode the overhead channel that employs a small block code such as orthogonal, bi-orthogonal or simplex codes.

Algorithms

At the terminal, the overhead channel information bits are encoded using a block code such as a bi-orthogonal code or simplex code. Then, the code bits from the encoder are mapped to the modulation symbols $a_l$. Each modulation symbol is repeated M times and multiplexed with the other channels for transmission over the communication channel.

The overhead and pilot channel symbols received are denoted by $x_l(m)$ and $p_l(m)$, respectively:

$$x_l(m) = e^{i\Theta(m)}\sqrt{E_o}a_l + w_{o,l}(m) \quad (1)$$

$$p_l(m) = e^{i\Theta(m)}\sqrt{E_p} + w_{p,l}(m) \quad (2)$$

where l: the symbol index.
m: the block index.
$a_l$: the l-th modulation symbol in multi-level phase shift keying (MPSK) format.
$\Theta(m)$: the unknown phase caused by the channel during the m-th block.
$E_o$: the energy of an overhead channel symbol.
$E_p$: the energy of a pilot symbol.
$w_{o,l}(m)$: the noise in the overhead channel.
$w_{p,l}(m)$: the noise in the pilot channel.

It is assumed that L modulation symbols $\{a_l\}_{l=1}^L$ are received during one block, and that there are M blocks. In other words, the L modulation symbols are repeated M times. Within a block, the channel is assumed to be constant. The sequences of $a_l(m)$, $x_l(m)$, $p_l(m)$ and $\Theta(m)$ are represented by the vectors $$a = [a_1, \ldots, a_L]^T \quad (3)$$

$$x_m = [x_1(m), \ldots, x_L(m)]^T \quad (4)$$

$$P_m = [p_1(m), \ldots, p_L(m)]^T \quad (5)$$

$$x = [x_1^T, \ldots, x_M^T]^T \quad (6)$$

$$p = [p_1^T, \ldots, p_M^T]^T \quad (7)$$

$$\underline{\theta} = [\Theta(1), \ldots, \Theta(M)] \quad (8)$$

The joint probability density function (pdf) of x and p can be written as $$f(x, p \mid a, \underline{\theta}) = C\exp\left(-\frac{\sum_{m=1}^{M}\sum_{l=1}^{L}|x_l(m) - e^{i\Theta(m)}\sqrt{E_t}\,a_l|^2}{2\sigma^2}\right) \\ C\exp\left(-\frac{\sum_{m=1}^{M}\sum_{l=1}^{L}|p_l(m) - e^{i\Theta(m)}\sqrt{E_p}|^2}{2\sigma^2}\right) \quad (9)$$

for some constant C. The maximum likelihood (ML) estimate of a is obtained by maximizing $f(x, p|a, \underline{\theta})$ over all possible a and $\underline{\theta}$:

$$(a_{ML}, \underline{\theta}_{ML}) = \underset{a,\underline{\theta}}{\operatorname{argmax}} f(x, p \mid a, \underline{\theta}) \quad (10)$$

Ml Decoding with Partial Channel Information

By simplifying (10), it can be shown that the ML codeword estimate a is given by $$a_{ML} = \underset{a}{\operatorname{argmax}} \sum_{m=1}^{M}\left|\hat{p}(m) + \frac{1}{L}\sqrt{\frac{E_o}{E_p}}\,a^H x_m\right| \quad (11)$$

where $\hat{p}(m)$ represents an estimate of the channel induced uncertainty $e^{i\Theta(m)}$ on the block indexed by m $$\hat{p}(m) \triangleq \frac{1}{L}\sum_{l=1}^{L} p_l(m) \quad (12)$$

Notice that $a^H x_m$ corresponds to correlating the candidate codeword a with the received codeword $x_m$. For an orthogonal code or bi-orthogonal code, this correlation can be computed with a Fast Hadamard Transform (FHT).

Optimal Decoding

FIG. 1 is a flow diagram showing the functional operation of a receiver for the GEO satellite reverse link using maximum likelihood decoding in accordance with an optimal configuration. An interpretation of equation (11) can be used for an optimal configuration as follows: Each possible codeword is treated as a hypothesis or candidate codeword (step 111). The received codeword is correlated (step 112) with each candidate codeword in the set of valid codewords to derive correlation results. Next, a pilot signal is received (step 113) or has already been received, and pilot symbols are then extracted from the pilot signal (step 114). A channel estimate is created from the pilot symbol (step 115).

A correlation result obtained from step 111 is scaled (step 122) by a function of the ratio of the overhead channel power to the pilot channel power to obtain a scaled correlation result. The scaled correlation result is added (step 123) to the channel estimate derived from the pilot at step 115. The absolute value of the result from step 123 is computed (step 124). This computation is repeated M times (step 125) for M blocks (or M repetitions), and the absolute value of these M results are summed (step 129) to obtain the metric for the candidate codeword. The metric is computed for each candidate codeword (step 133), and the decoder outputs (step 135) the candidate codeword with largest metric.

In summary, the ML decoding technique computes a metric for each candidate codeword, using the received codeword and a channel estimate from the pilot symbols. The decoder outputs the candidate codeword with largest metric.

Suboptimal Decoding

A suboptimal configuration is advantageous in that it may be easier to implement. Equation (11) is modified to obtain a more implementation friendly form, $$\hat{a} = \underset{a}{\operatorname{argmax}} \sum_{m=1}^{M}\left|\hat{p}(m) + \frac{1}{L}\sqrt{\frac{E_o}{E_p}}\,a^H x_m\right|^2 \quad (13)$$

Equation (13) can be rewritten as $$\hat{a} = \underset{a}{\arg\max}\, \mu(a) \quad (14)$$

where $\mu(a)$ is the proposed suboptimal metric corresponding to the codeword a, $$\mu(a) = \sum_{m=1}^{M} Re[a^H x_m \hat{p}^*(m)] + \frac{1}{2L}\sqrt{\frac{E_o}{E_p}} \sum_{m=1}^{M} |a^H x_m|^2 \quad (15)$$

A successful candidate codeword is chosen based on a metric, the metric depending on:
(a) Channel estimate from the pilot channel, $\hat{p}(m)$;
(b) Inner product or correlation of the candidate codeword and the received codeword; and
(c) Ratio of the overhead channel symbol energy to the pilot symbol energy FIG. 2 is a flow diagram showing the functional operation of a receiver for the GEO satellite reverse link using maximum likelihood decoding in accordance with a suboptimal configuration.

First, a set of valid codewords is established (step 211). Each codeword is treated as a hypothesis or candidate codeword. For each block, code symbols from a codeword are received and the received codeword is correlated with a candidate codeword in the set of valid codewords (step 212). Next, a pilot signal is received (step 213) or has already been received, and pilot symbols are then extracted from the pilot signal (step 214). A channel estimate is created from the pilot symbol (step 215). The complex conjugate of the channel estimate is multiplied (step 216) by the correlation result obtained in step 212. The real parts of the results are summed (step 217) over the M blocks to produce the first function in equation (15).

Next, the energy of the correlation result is computed (step 218) and the energies are summed (step 219) over the M blocks. The sum of the energy results is scaled by a function depending on the ratio of the overhead channel power to the pilot channel power, and the number of symbols L in a block, to produce the second function in equation (15). The first function (from step 217) and the second function (from step 219) are summed. The summing of the first and second functions is used to obtain the metric for the candidate codeword (step 223). The metric is computed for each candidate codeword using the procedure above (step 224) and the candidate codeword with the largest metric is chosen (step 225).

Figure 2:
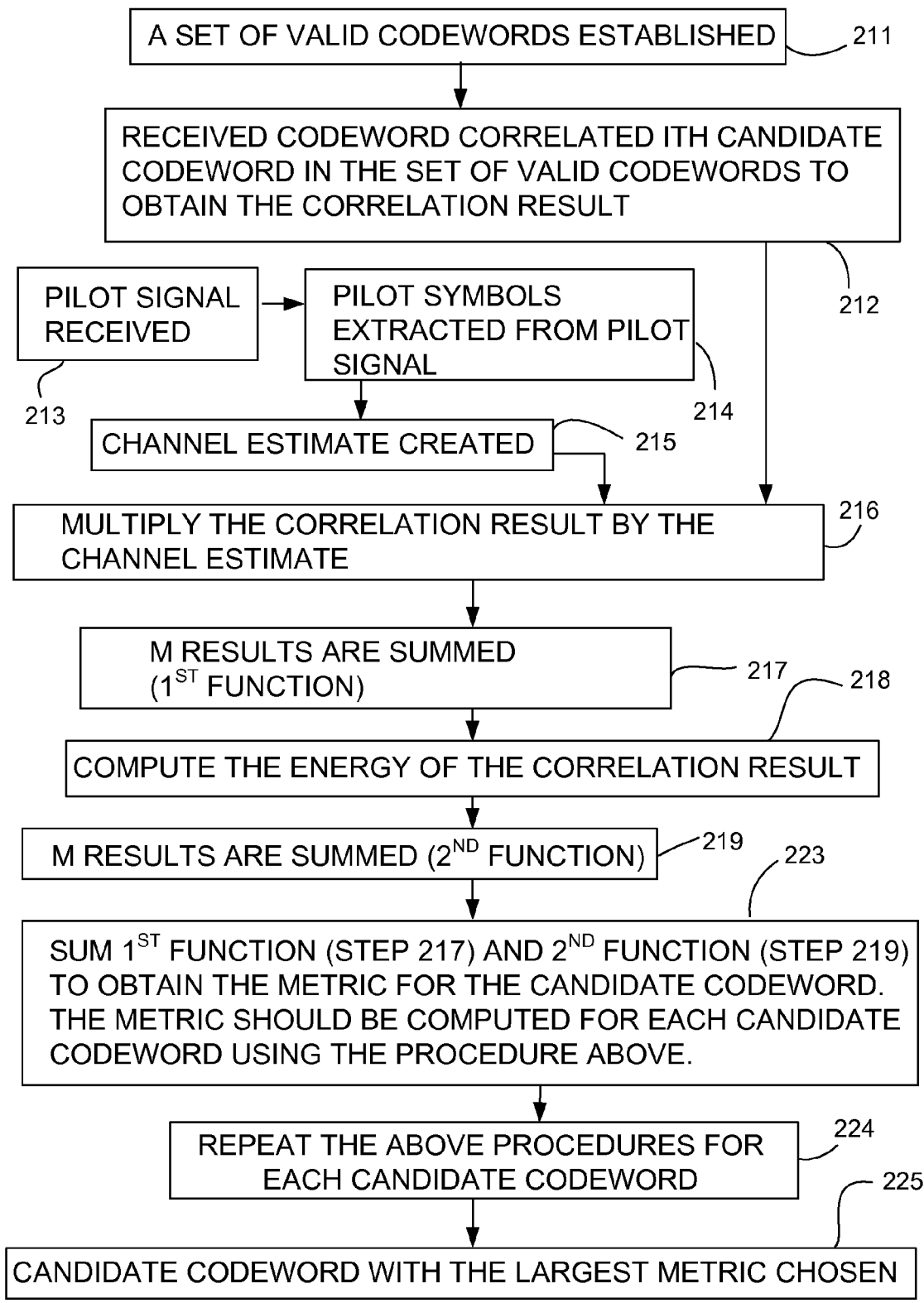
FIG. 2 is a flow diagram showing the functional operation of a receiver for the GEO satellite reverse link using maximum likelihood decoding in accordance with a suboptimal configuration.

In contrast to the receiver procedure described in FIG. 2, a typical conventional coherent receiver uses a metric derived from only the first term in (15) to make decision on the received codeword. This is equivalent to performing the maximum likelihood decoding of the received codeword x pretending that $\hat{p}$ provides the knowledge of the true channel. On the other hand, a metric derived from the second term in (15) is used by a conventional non-coherent receiver. Unlike the conventional methods, the proposed algorithm uses both metrics: based on the power of the pilot symbol relative to the overhead channel data symbol, the two metrics are appropriately weighted and combined to obtain the combined metric for this codeword. If the pilot symbol energy $E_p$ is very large compared with the overhead data symbol energy $E_0$, (14) essentially becomes the coherent demodulation based decoding. If $E_p$ is very small compared with $E_0$, (14) essentially becomes the non-coherent demodulation based decoding.

The proposed approaches may be inadequate for the packets of large size—for example, if a data packet has 48 bits, $2^{48}$ metrics may need to be evaluated. However, for small packet sizes typically used by the overhead channels, (11) or (14) can be implemented with only a small increase in the computational complexity relative to the conventional method.

Figure 3:
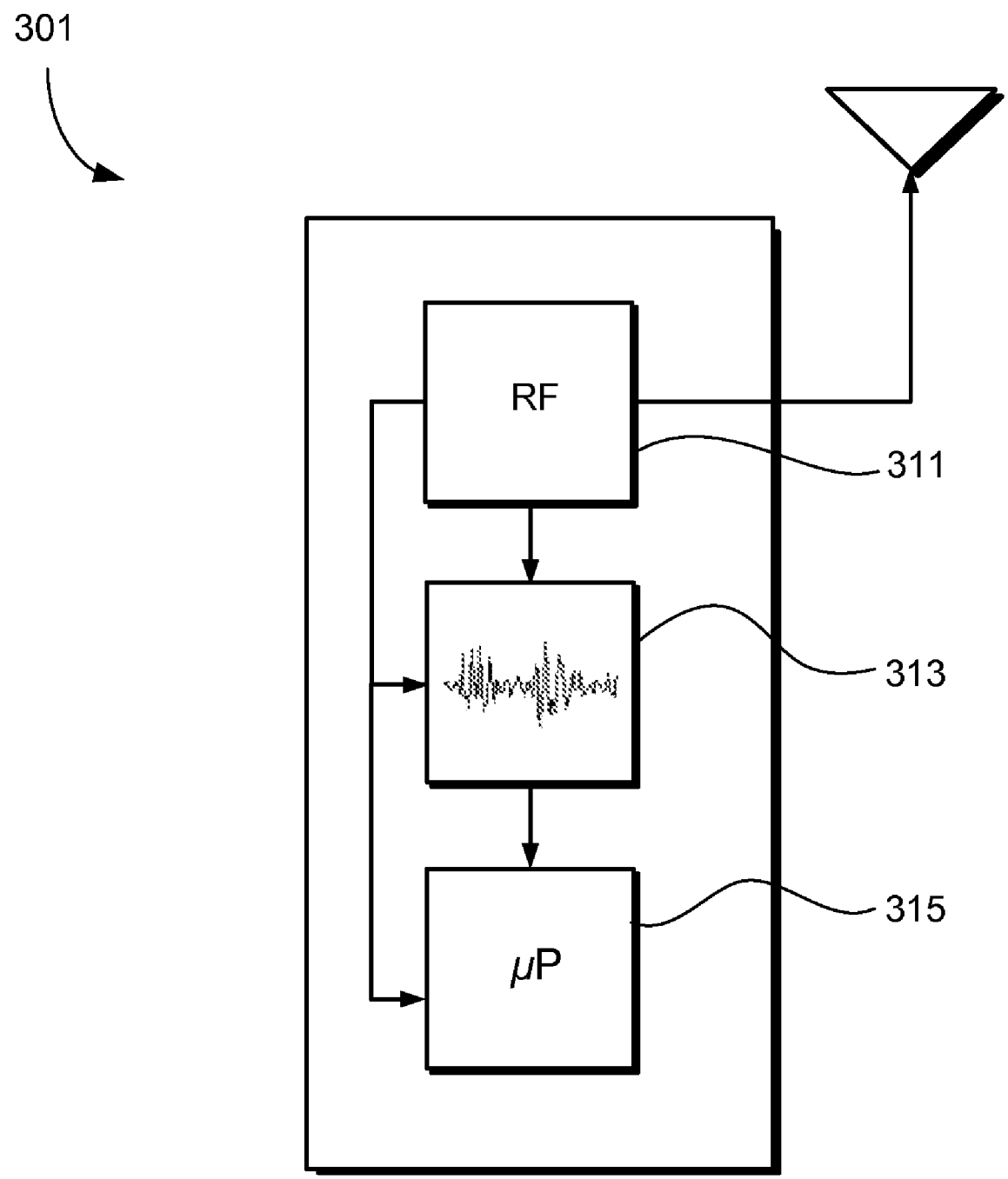
FIG. 3 is a schematic block diagram of a wireless communication device (WCD) constructed in accordance with the present invention.

FIG. 3 is a schematic block diagram of a wireless communication device (WCD) constructed in accordance with the present invention.

The WCD 301 includes an RF circuit 311, for communicating with the satellite, and processing circuitry 313 for processing the communications. By way of example, processing circuitry can include spreaders, despreaders and related logic. The WCD 301 includes a processor 315 that performs control functions, although in many cases the processor 315 is integrated with the processing circuitry 313 and may be further integrated with the RF circuit 311.

The processor 315 includes an integrated circuit configured to receive and demodulate received signals to a demodulated spread spectrum signal; a processing circuit configured to parse a pilot signal and extract pilot symbols from the pilot signal; a circuit providing a set of valid codewords; a despreader circuit extracting a codeword from the pilot signal; a correlation circuit capable of correlating the received codeword with valid codeword models; a determination circuit capable of choosing a codeword with the largest correlation; an initial channel estimation circuit providing an initial channel estimate; and a channel estimate adjustment circuit creating a revised channel estimate from the correlated codeword.

The processor 315 may be a monolithic integrated circuit or a chipset.

Simulation Results

Here, the simulation results are presented for the proposed schemes described in the first and second methods. The following is considered:

6 bit overhead channel packets encoded with a rate 6/32 bi-orthogonal code ($L=2^5$).
Binary Phase Shift Keying (BPSK) Modulation
$E_o/E_p=4$ dB.
The system bandwidth=1.2288 MHz.
It is assumed that the channel is constant for 20 ms and one codeword is transmitted over 20 ms duration or 24576 chips. Hence, a codeword is repeated 768 times.

Figure 4:
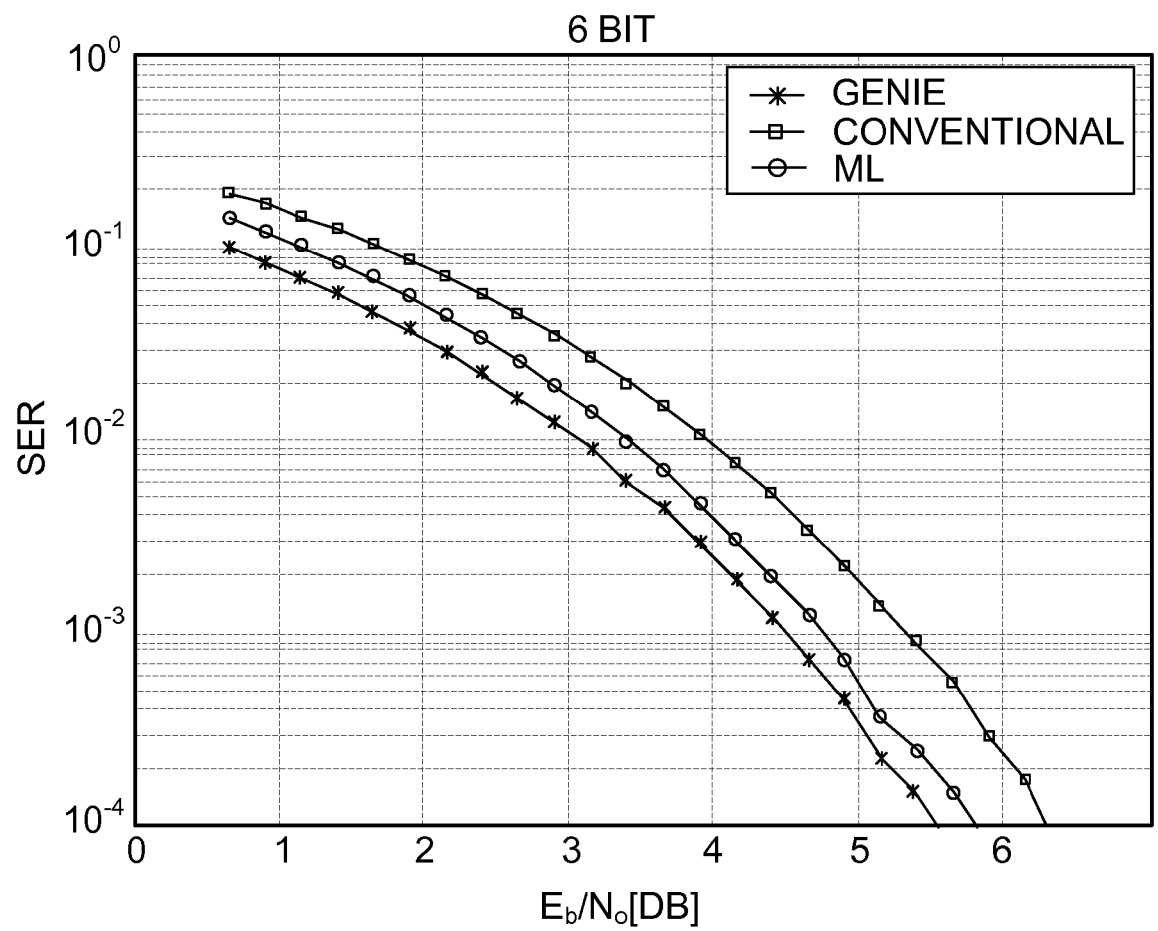
FIG. 4 illustrates an example of bi-orthogonal code, 6 information bits, L=64, M=1, $E_o/E_p$=4 dB.

FIG. 4 illustrates an example of bi-orthogonal code, 6 information bits, L=32, M=1, and $E_o/E_p=4$ dB. In this case where M=1, the "suboptimal" method in (14) is equivalent to the optimum ML method in (11). In other words, (15) performs as well as (11) for M=1. The proposed methods outperform the conventional coherent receiver by 0.5-0.6 dB, while it is only 0.25 dB worse than the receiver with perfect channel information.

Figure 5:
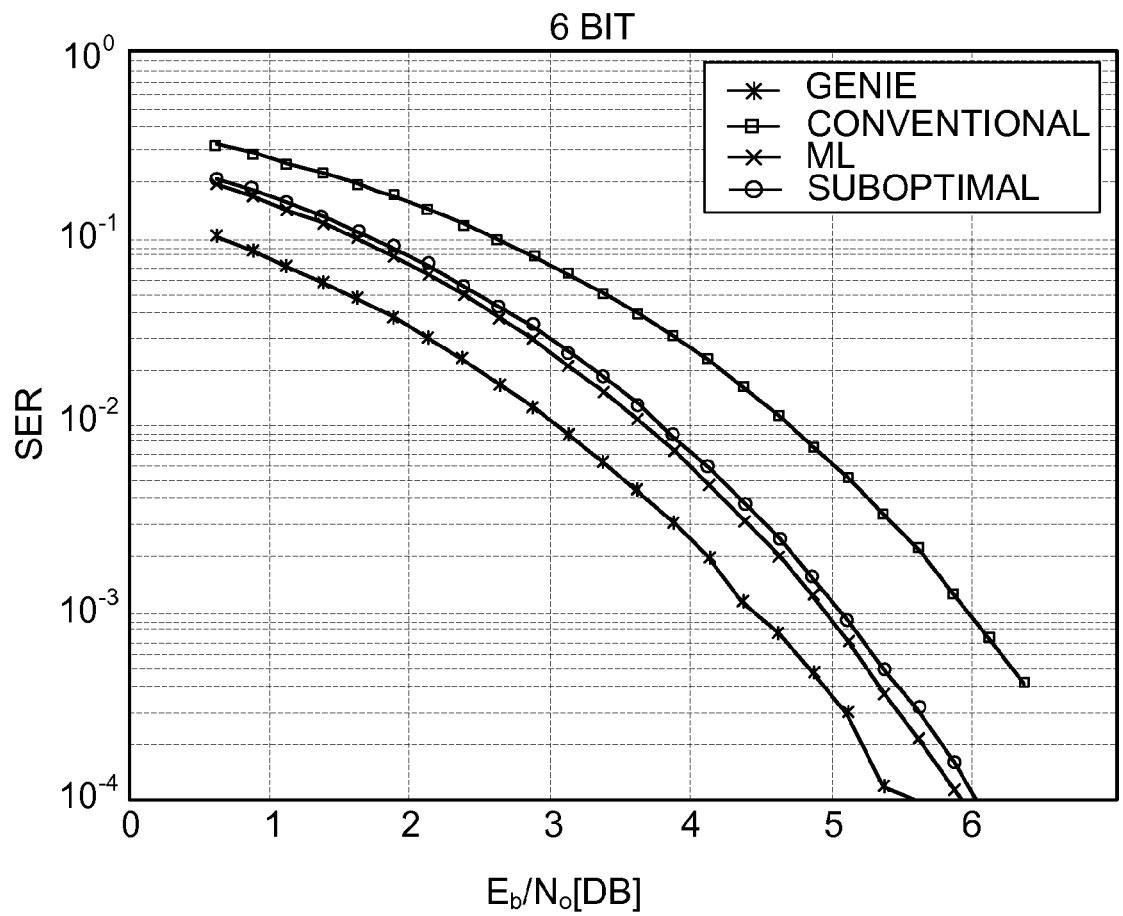
FIG. 5 illustrates an example of bi-orthogonal code, 6 information bits, L=64, M=2, $E_o/E_p$=4 dB.

The cases where the channel may be varying within the 20 ms frame is considered with reference to FIG. 5. FIG. 5 illustrates an example of bi-orthogonal code, 6 information bits, L=32 and $E_o/E_p=4$ dB. In FIG. 4, the channel is assumed constant for 10 ms whereas the transmission duration is 20 ms. Therefore, M=2 in this case. The suboptimal decoding is about 0.1 dB worse than the optimal ML method and 0.6 dB worse than the receiver with the perfect channel information. Nevertheless, it outperforms the conventional receiver by nearly 1 dB.

Figure 6:
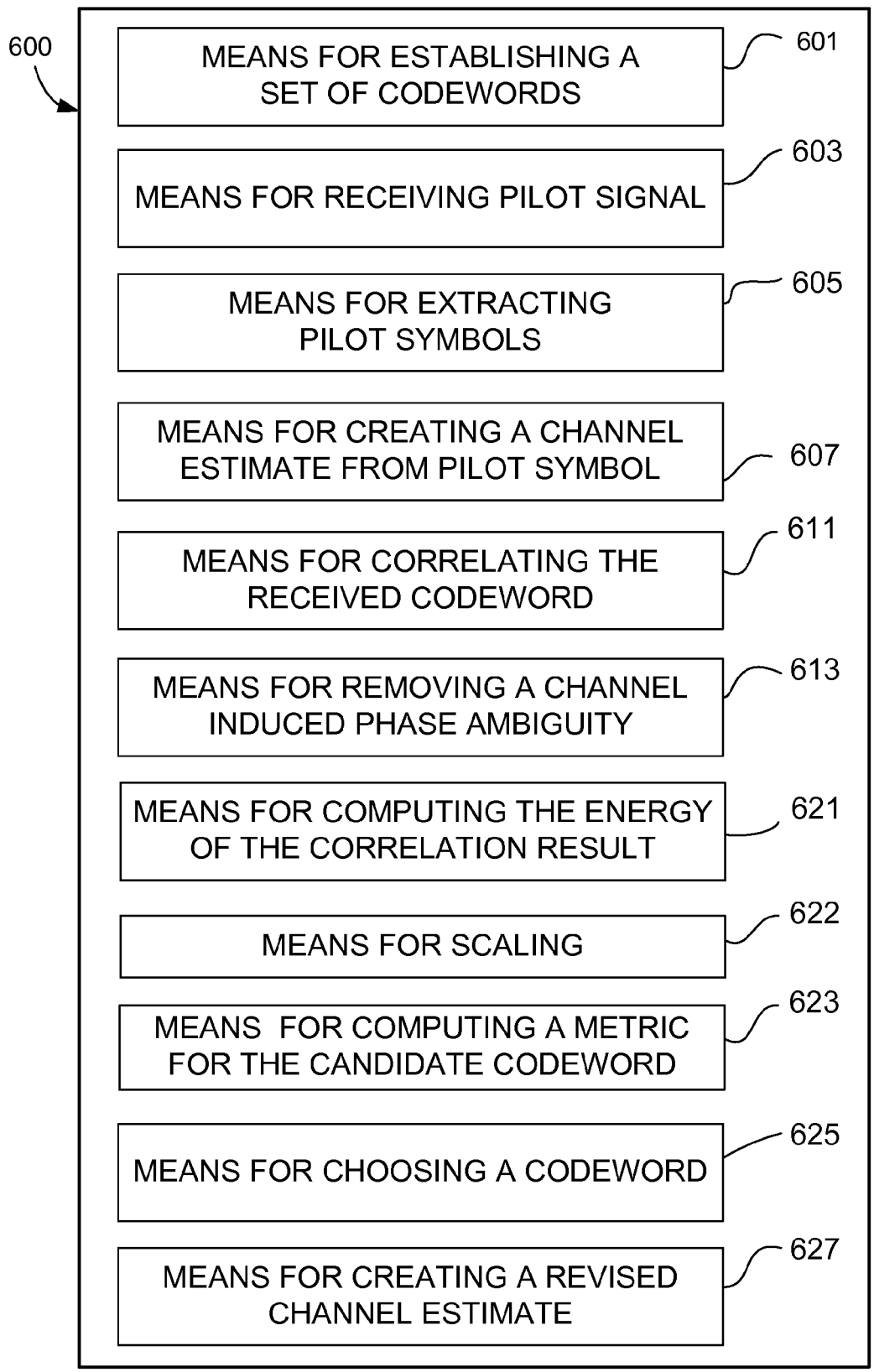
FIG. 6 is a schematic block diagram illustrating the functional operation of a coherent receiver used in a wireless communication system in accordance with the invention.

FIG. 6 is a schematic block diagram illustrating the functional operation of a coherent receiver 600 used in a wireless communication system in accordance with the invention.

Means 601 for establishing a set of codewords establishes a set of valid codewords, and are connected to means 603 for receiving a pilot signal. Means 603 are connected to means 605 for extracting pilot symbols from the pilot signal. Means 605 are connected to means 607 for creating a channel estimate from the pilot symbol. Means 607 are connected to means 611 for correlating the received codeword with each codeword in the set of valid codewords. Means 611 are connected to means 613 for partially removing a channel induced phase ambiguity using a channel estimate obtained from the pilot symbols. Means 611 are connected to means 621 for computing the energy of the correlation result. The means 621 for computing the energy are connected to means 622 for scaling the result from the means 621 for computing the energy. The scaling is provided as a function of the ratio of the overhead symbol energy to the pilot symbol energy. The means 622 for scaling the result and the means 613 for removing the phase ambiguity are connected to means 623 for computing the metric for the candidate codeword by adding the result from means 622 and means 613. The means 623 for computing the metric are connected to means 625 for choosing a codeword with the largest metric. The chosen codeword is provided to means 627 for creating a revised channel estimate.

CONCLUSION

Those skilled in the art will appreciate that the various illustrative logical blocks, modules, circuits, and algorithms described in connection with the embodiments disclosed herein may be implemented as electronic hardware, computer software, or combinations of both. To clearly illustrate this interchangeability of hardware and software, various illustrative components, blocks, modules, circuits, and algorithms have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, microprocessor, or state machine. A processor may also be implemented as a combination of computing devices, e.g., a combination of a DSP and a microprocessor, a plurality of microprocessors, one or more microprocessors in conjunction with a DSP core, or any other such configuration.

The methods or algorithms described in connection with the embodiments disclosed herein may be embodied directly in hardware, in a software module executed by a microprocessor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. For example, one or more elements can be rearranged and/or combined, or additional elements may be added. Thus, the present invention is not intended to be limited to the embodiments shown herein but is to be accorded the widest scope consistent with the principles and novel features disclosed herein.

What is claimed is:

1. A method to determine a codeword conveyed in an overhead channel in a coherent receiver used in a wireless communication system, the method comprising:
   using an antenna for receiving the codeword;
   correlating the received codeword with at least a subset of a set of valid codewords to establish a set of cross-correlations for the received codeword corresponding to each member of the at least the subset of the set of valid codewords;
   extracting pilot symbols from a received pilot signal;
   forming a channel estimate from the extracted pilot symbols;
   forming a set of metrics from the set of cross-correlations and from the channel estimate, wherein each of the set of metrics is formed by summing a coherent detection metric and a non-coherent detection metric; and
   selecting an estimated codeword corresponding to a maximum metric from the set of metrics.

2. The method of claim 1, further comprising
   scaling each of the set of cross-correlations by a function of a ratio of an overhead channel power to a pilot channel power to obtain a scaled correlation result.

3. The method of claim 2, wherein the function comprises a square root.

4. The method of claim 1, further comprising:
   scaling the cross-correlations of the received codewords with the subset of the set of valid codewords, said scaling performed at least in part as a function of a ratio of overhead channel power to pilot channel power; and
   using the scaled cross-correlations in the forming of the set of metrics by one of
      adding the channel estimate formed from the received pilot signal, or
      computing an absolute value of a sum of the scaled cross-correlation result and the channel estimate formed from the received pilot signal.

5. The method of claim 1, further comprising:
determining a correspondence of the received codeword by multiplying a result of the correlation by a complex conjugate of the channel estimate, and taking the real part of the multiplication;
repeating the determination for a predetermined number of repetitions;
summing the determinations, forming the coherent detection metric;
computing the energy of the correlation result;
repeating the computation of the energy of the correlation result;
summing the computations; and
scaling a sum of the computations by a function of a ratio of overhead channel power to pilot channel power, forming the non-coherent detection metric.

6. The method of claim 5, further comprising:
using the receiver in a geosynchronous (GEO) satellite reverse link using maximum likelihood decoding.

7. The method of claim 5, further comprising:
employing a small block code selected from one of orthogonal, bi orthogonal and simplex codes.

8. The method of claim 5, further comprising:
employing a Walsh-Hadamard transformation to establish the set of valid codewords from a small block code selected from one of orthogonal, bi orthogonal and simplex codes.

9. A coherent receiver used in a wireless communication system, comprising:
means for receiving a codeword conveyed in an overhead channel;
means for correlating the received codeword with at least a subset of a set of valid codewords to establish a set of cross-correlations for the received codeword corresponding to each member of the at least the subset of the set of valid codewords;
means for extracting pilot symbols from a received pilot signal;
means for forming a channel estimate from the extracted pilot symbols;
means for forming a set of metrics from the set of cross-correlations and from the channel estimate, wherein each of the set of metrics is formed by summing a coherent detection metric and a non-coherent detection metric; and
means for selecting an estimated codeword corresponding to a maximum metric from the set of metrics.

10. The coherent receiver of claim 9, further comprising:
means for scaling each of the set of cross-correlations by a function of a ratio of an overhead channel power to a pilot channel power to obtain a scaled correlation result.

11. The coherent receiver of claim 9, further comprising:
means for scaling the cross-correlations of the received codewords with the subset of the set of valid codewords, said scaling performed at least in part as a function of a ratio of overhead channel power to pilot channel power, and using the scaled cross-correlations in the forming of the set of metrics.

12. The coherent receiver of claim 9, further comprising:
means for scaling the cross-correlations of the received codewords with the subset of the set of valid codewords, said scaling performed at least in part as a function of a ratio of overhead channel power to pilot channel power, and using the scaled cross-correlations in the forming of the set of metrics by adding the channel estimate formed from the received pilot signal.

13. The coherent receiver of claim 9, further comprising:
means for scaling the cross-correlations of the received codewords with the subset of the set of valid codewords, said scaling performed at least in part as a function of a ratio of overhead channel power to pilot channel power, to provide a scaled cross-correlation result, and using the scaled cross-correlations in the forming of the set of metrics by computing an absolute value of a sum of the scaled cross-correlation result and the channel estimate formed from the received pilot signal.

14. The coherent receiver of claim 9, further comprising:
means for determining a correspondence of the received codeword by multiplying a result of the correlation by a complex conjugate of the channel estimate, and taking the real part of the multiplication;
means for repeating the determination for a predetermined number of repetitions;
means for summing the determinations, forming the coherent detection metric;
means for computing the energy of the correlation result;
means for repeating the computation of the energy of the correlation result;
means for summing the computations; and
means for scaling a sum of the computations by a function of a ratio of overhead channel power to pilot channel power, forming the non-coherent detection metric.

15. The coherent receiver of claim 14, further comprising:
means for employing a small block code selected from one of orthogonal, bi orthogonal and simplex codes.

16. A coherent receiver used in a wireless communication system, the coherent receiver comprising a processor coupled to a memory, the memory storing program codes executable by the processor for performing the following:
receiving a codeword conveyed in an overhead channel;
correlating the received codeword with at least a subset of a set of valid codewords to establish a set of cross-correlations for the received codeword corresponding to each member of the at least the subset of the set of valid codewords;
extracting pilot symbols from a received pilot signal;
forming a channel estimate from the extracted pilot symbols;
forming a set of metrics from the set of cross-correlations and from the channel estimate, wherein each of the set of metrics is formed by summing a coherent detection metric and a non-coherent detection metric; and
selecting an estimated codeword corresponding to a maximum metric from the set of metrics.

17. The coherent receiver of claim 16, further comprising wherein the processor is further configured to performing the following:
scaling the cross-correlations of the received codewords with the subset of the set of valid codewords, said scaling performed at least in part as a function of a ratio of overhead channel power to pilot channel power, and
using the scaled cross-correlations in the forming of the set of metrics by one of:
adding the channel estimate formed from the received pilot signal, or
computing an absolute value of a sum of the scaled cross-correlation result and the channel estimate formed from the received pilot signal.

18. The coherent receiver of claim 16, wherein the processor is further configured to performing the following:

determining a correspondence of the received codeword by multiplying a result of the correlation by a complex conjugate of the channel estimate, and taking the real part of the multiplication;

repeating the determination for a predetermined number of repetitions;

summing the determinations, forming a first partial the coherent detection metric;

computing the energy of the correlation result;

repeating the computation of the energy of the correlation result;

summing the computations; and scaling a sum of the computations by a function of a ratio of overhead channel power to pilot channel power, forming the non-coherent detection metric.

19. The coherent receiver of claim 18, wherein the processor is further configured to performing the following:

using the receiver in a GEO satellite reverse link using maximum likelihood decoding.

20. The coherent receiver of claim 18, wherein the processor is further configured to performing the following:

employing a small block code selected from one of orthogonal, bi orthogonal and simplex codes.

21. The coherent receiver of claim 18, wherein the processor is further configured to performing the following:

employing a Walsh-Hadamard transformation to establish the set of valid codewords from a small block code selected from one of orthogonal, bi orthogonal and simplex codes.

22. A non-transitory computer-readable medium encoded with a computer program, the non-transitory computer-readable medium comprising:

a first instruction for causing a computer to receive a codeword;

a second instruction for causing the computer to establish a set of valid codewords;

a third instruction for causing the computer to receive a pilot signal;

a fourth instruction for causing the computer to extract pilot symbols from the pilot signal;

a fifth instruction for causing the computer to create a channel estimate from the pilot symbol;

a sixth instruction for causing the computer to determine a set of metrics corresponding to correlations between the received codeword and each codeword in the set of valid codewords, wherein each of the set of metrics is determined by summing a coherent detection metric and a non-coherent detection metric;

a seventh instruction for causing the computer to remove a channel induced phase ambiguity using a channel estimate obtained from the pilot symbols;

an eighth instruction for causing the computer to choose a codeword with the largest correlation; and a ninth instruction for causing the computer to create a revised channel estimate from a received signal carrying the chosen codeword.

* * * * *